US006314388B1

(12) United States Patent
Zelt, III

(10) Patent No.: US 6,314,388 B1
(45) Date of Patent: Nov. 6, 2001

(54) DESIGN TOOL FOR PREDICTIVELY INDICATING EDGE CONDITIONS IN METAL SLITTING

(75) Inventor: Albert R. Zelt, III, Bethel Park, PA (US)

(73) Assignee: Asko, Inc., Homestead, PA (US)

(*) Notice: Subject to any disclaimer, the term of this patent is extended or adjusted under 35 U.S.C. 154(b) by 0 days.

(21) Appl. No.: 09/150,523

(22) Filed: Sep. 10, 1998

(51) Int. Cl.[7] .............................. G06F 7/60; G06F 17/10; G06F 101/00

(52) U.S. Cl. ......................... 703/2; 703/1; 703/7; 407/30

(58) Field of Search .................................... 703/1, 6, 7, 2, 703/3; 407/30

(56) References Cited

U.S. PATENT DOCUMENTS 5,574,890 11/1996 Zelt ...................................... 395/500

FOREIGN PATENT DOCUMENTS

WO 96/03245 2/1996 (WO) .
WO 97/27968 8/1997 (WO) .

*Primary Examiner*—Kevin J. Teska
*Assistant Examiner*—Samuel Broda
(74) *Attorney, Agent, or Firm*—Reed Smith LLP

(57) ABSTRACT

A design tool for predictively indicating, in metal slitting, expected edge conditions of slit metal. Also contemplated is a corresponding method. Further contemplated is a design tool and method for providing, in metal slitting, a predictive assessment of at least one condition relating to at least one of: knife edge and slit metal edge.

8 Claims, 12 Drawing Sheets

DESIGN TOOL FOR PREDICTIVELY INDICATING EDGE CONDITIONS IN METAL SLITTING

FIELD OF THE INVENTION

The present invention relates to a computer design tool for rotary slitting of metal and a method of use of such a design tool, and especially to a design tool for improving edge conditions in the continuous rotary slitting of coiled metal.

BACKGROUND OF THE INVENTION

Slitting is the dividing of a single, wide strip of metal into narrower strips or slits (also called mults or strands). Some products made from slit metal stock include cans, razor blades, Venetian blinds, office furniture, automobile parts, electrical equipment, appliances, aerospace parts, medical equipment, building materials, jewelry and blanks for minting coins. Slitting is also applied to nonmetallic materials including paper, plastic, film and fiber.

Although metal slitting machines may vary in size from so-called "tabletop" slitters with small motors (used for foil to light gauge material) to those using motors of several hundred horsepower and requiring a building hundreds of feet in length, all slitting machines require essentially the same type of tooling, and vary only in the size, quantity and customization of the end use. A comprehensive review of metal slitting machinery and a discussion of many of the system parameters relevant to such machinery may be found in Rogers, J. W. and Millan, W. H., *Coil Slitting,* Pergamon Press (1972), the disclosure of which is incorporated herein by reference.

In general, all slitting machines have three major components: (1) a means to get the metal to the slitter—for coil slitters it is an uncoiler (also referred to as an unwinder or payoff reel); (2) a slitter head—for holding the rotary knives and associated tooling (such as spacers, stripper rings etc.) and (3) a recoiler (also referred to as a rewinder or take-up reel)—for rewinding the mults (strands).

In view of the increasingly precise mult width specifications required of metal providers, a design tool for assisting operators of slitting machinery to more accurately adjust mult width to account for slit width variation became very desirable. Accordingly, a design tool was developed by Asko, Inc. of West Homestead, Pennsylvania, that assists an operator to arrive at an estimate of slit width variation and thereby an estimate of the adjustment required of slitter knife position to achieve a desired mult width. This design tool is the subject of U.S. Pat. No. 5,574,890, herein incorporated by reference. Generally, this design tool provided an apparatus for providing an estimation of slit widths for providing an estimation of slit width variation with substantially greater accuracy as was then achievable in metal slitting.

Over the years, it also has been recognized that the edges of slit metal can exhibit a wide variety of configurations, some less favorable than others. Furthermore, it has often been recognized, at a qualitative level, that certain types of slitting parameters, as defined, e.g., by the material being slit, the number and configuration of knives being used, and other factors, can lend a reasonable prediction of the edge defects or conditions that might be encountered. However, because of the subjectivity of such a determination, and because the boundary parameters for delineating the subjective types of edge conditions from one another are difficult to determine qualitatively by an operator, the result has still been a great deal of lost slitting runs. Particularly, a significant quantity of waste material must usually be processed in order to assess the possibly defective edge conditions that might justify the types of adjustments needed to eradicate the defective edge conditions and correct the parameters that bring them about. The same holds true, in fact, in the context of assessing quantitative strip edge conditions (e.g. burr height, shear angle, slit-to-shear ratio, etc.). Accordingly, a need has been recognized in conjunction with providing a predictive analysis of the likelihood that a given slitting run will result in defective edge conditions, and if so, what the edge conditions might actually be.

SUMMARY OF THE INVENTION

In accordance with at least one presently preferred embodiment of the present invention, an arrangement is contemplated in which, upon a computer design tool or the like being provided with sufficient input related to the parameters of a slitting run, an accurate predictive indication can be afforded, qualitatively or quantitatively, of the edge conditions that are likely to be encountered.

In accordance with a preferred embodiment, a visual assessment of the predicted edge conditions will be provided by producing, from a suitable storage arrangement such as a CD-ROM, a photographic representation of the predicted edge conditions, suitable for duplication on a computer monitor. Although a very wide range of such images are conceivable, the present invention, in accordance with at least one presently preferred embodiment, presently contemplates at least four conditions that can be imaged in this manner.

Conceivably, it might also be possible to provide, as an output of the predictive edge condition analysis, one or more quantitative variables relating to edge conditions. Included among these quantitative variables are, for example, the shear angle, burr height and "slit-to-shear" ratio of a cut edge.

Similarly to the arrangements described in U.S. Pat. No. 5,574,890, a "learning" arrangement is also contemplated within the scope of the present invention, in which actual results from various slitting runs can be tabulated, either manually or automatically, in such a way as to promote a more accurate predictive analysis of edge conditions for future slitting runs. This "learning" concept is conceivable both in regard to quantitative data and qualitative data.

Generally, at least one presently preferred embodiment of the present invention broadly contemplates a design tool for predictively indicating, in metal slitting, expected edge conditions of slit metal.

Additionally, at least one presently preferred embodiment of the present invention broadly contemplates a method for predictively indicating, in metal slitting, expected edge conditions of slit metal.

Further, at least one presently preferred embodiment of the present invention broadly contemplates a method of providing, in metal slitting, a predictive assessment of at least one condition relating to at least one of: knife edge and slit metal edge.

Finally, but not necessarily exclusively, at least one presently preferred embodiment of the present invention broadly contemplates a methods of providing, in metal slitting, a predictive assessment of at least one condition relating to at least one of: knife edge and slit metal edge.

BRIEF DESCRIPTION OF THE DRAWINGS

The present invention and its presently preferred embodiments will be better understood by way of reference to the detailed disclosure herebelow and to the accompanying drawings, wherein.

DETAILED DESCRIPTION OF THE INVENTION

1. Description of the Slitting Process

In discussing the present invention, it is first helpful to set forth in some detail the design of slitting heads and the slitting process.

Although there are many variations of slitter heads, most slitter heads tend to have essentially the following design: (1) a pair of arbors which hold the knives, spacers and stripper rings (if stripper rings are used); (2) a pair of housings which hold the arbors in position; and (3) a method of adjusting the arbors vertically. Some slitter heads also include a motor to drive the arbors.

Figure 1:
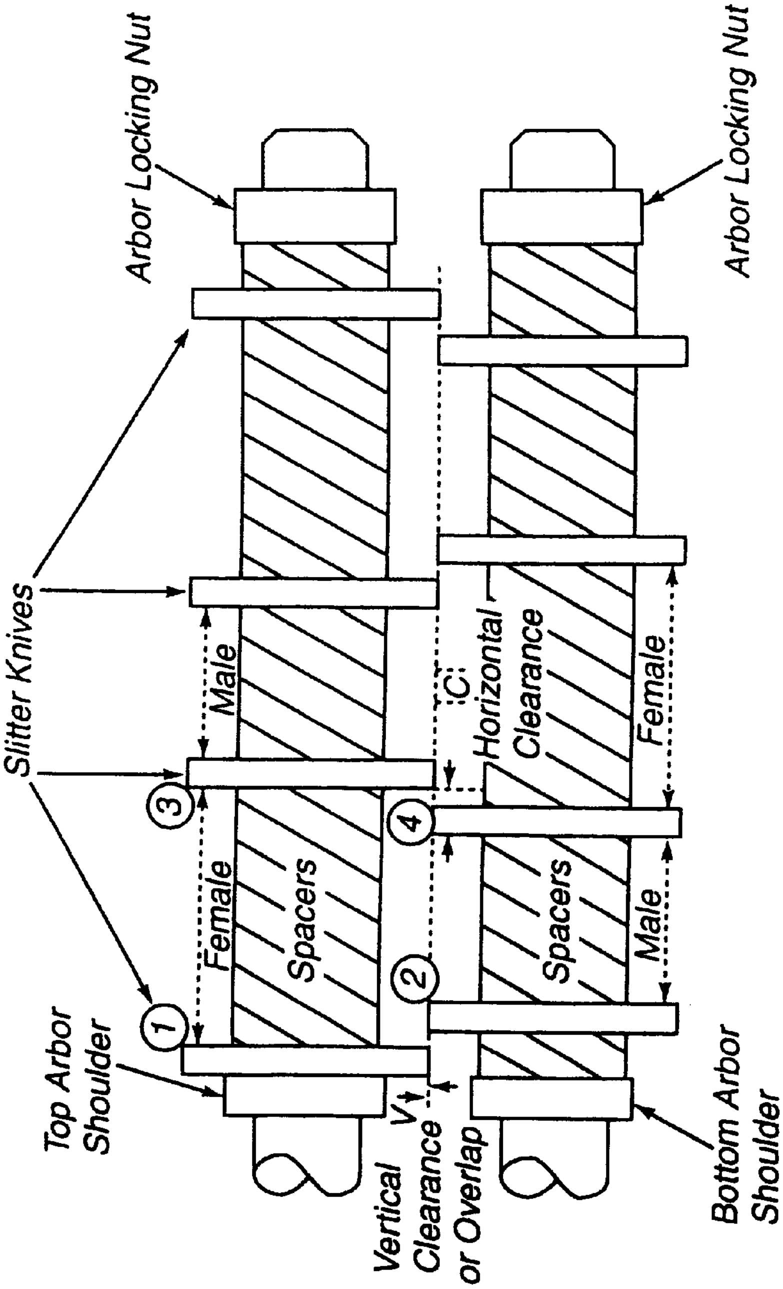
FIG. 1 illustrates an arbor setup.

Referring to FIG. 1, slitting is accomplished by two sets of circular slitting knives, mounted on parallel shafts (arbors) and set in a staggered sequence. The theoretical width of a slit, mult or strand is generally approximated by the distance between consecutive slitter knives upon an arbor. The slitting knives are so aligned and overlapped (between arbors) as to cause a shearing action to take place when a piece of metal is forced therebetween.

Spacers fit over the arbors between the knives to position each knife correctly to obtain desired slit or mult widths. Because slitter operators slit a variety of widths, the operators must inventory spacers of differing width. Additionally, plastic shims traditionally have been used to increase a slitter operator's ability to accommodate a number of mult widths. Shims are inserted between spacers or between spacers and knives to make the final adjustments to mult width and horizontal clearance. "Horizontal clearance" refers to the horizontal separation between the shearing planes of opposing knives as illustrated in FIG. 1.

The use of shims has decreased in recent years because the thickness of plastic shims is not held to the accuracy required in current slitting operations and, even if such thickness is accurately known, such plastic shims are compressible and will change size when inserted in the setup.

The knife arrangement shown in FIG. 1 is a typical slitter knife arrangement, known as a male-and-female arrangement. This knife arrangement is meant only to be exemplary, however. The present invention is suitable for use with any knife arrangement.

In the male-and-female arrangement, the first knife is placed on the top arbor against the inboard locating shoulder. A spacer (or spacers or a combination of spacers and shims) equal in thickness to the width of the knife plus the desired clearance is placed on the bottom arbor against the shoulder. Then the second knife is placed on the bottom arbor. A spacer (or spacers) usually equal to the width of the strip to be slit is placed on the top arbor and a third knife is added. A spacer (or spacers) of suitable width (to accommodate horizontal clearance) is placed on the bottom arbor and a fourth knife is added. This pattern is repeated across the arbors.

Figure 2A:
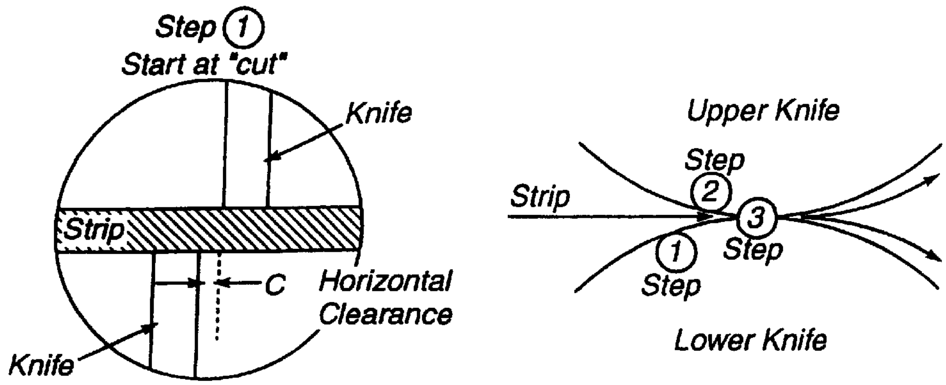
FIGS. 2A through 2C illustrate the sequence of events occurring in the slitting of a sheet of metal between opposing rotary slitting knives.
Figure 2B:
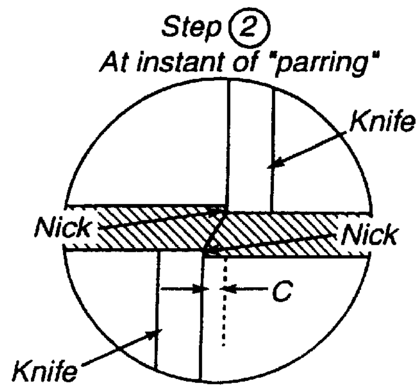
Figure 2C:
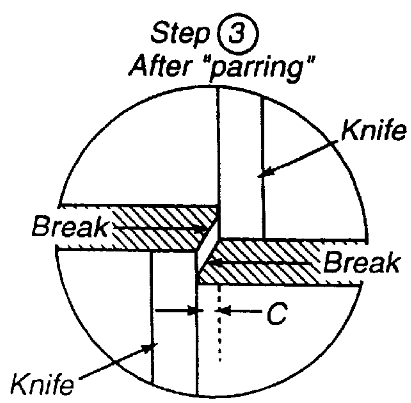

During slitting operations, as the metal strip enters between the arbors (see FIG. 2A), the knives penetrate the strip (see FIG. 2B) until the shear forces upon the strip exceed the ultimate tensile strength of the material and the strip separates (see FIG. 2C). The penetration is commonly referred to as the "nick" and the separation is commonly referred to as the "break." The depth of penetration is influenced by the ultimate tensile strength of the material and its relationship to the yield strength and the thickness of the strip.

When the horizontal clearance is correct and the knives are in good condition, a good slit edge results. An "ideal" slit edge has: (1) a shiny penetration zone (nick) (2) a smooth, matte gray separation zone (break) and (3) a relatively straight demarcation between the two zones. The most important factor in achieving an "ideal" slit edge is the horizontal clearance between a pair of slitter knives. The proper horizontal clearance depends primarily upon the thickness of the material and the tensile strength of the material. In general, as the gauge of the strip and/or its tensile strength increases, the horizontal clearance between opposing knife blades should be increased. Other important parameters that affect proper horizontal clearance are: (i) the condition of the equipment, including arbor parallelism, (ii) the condition of the arbor bearings, (iii) arbor deflection, (iv) the condition of the slitter tooling (e.g., knives, spacers and shims) and (v) the cleanliness of the setup.

Figure 3:
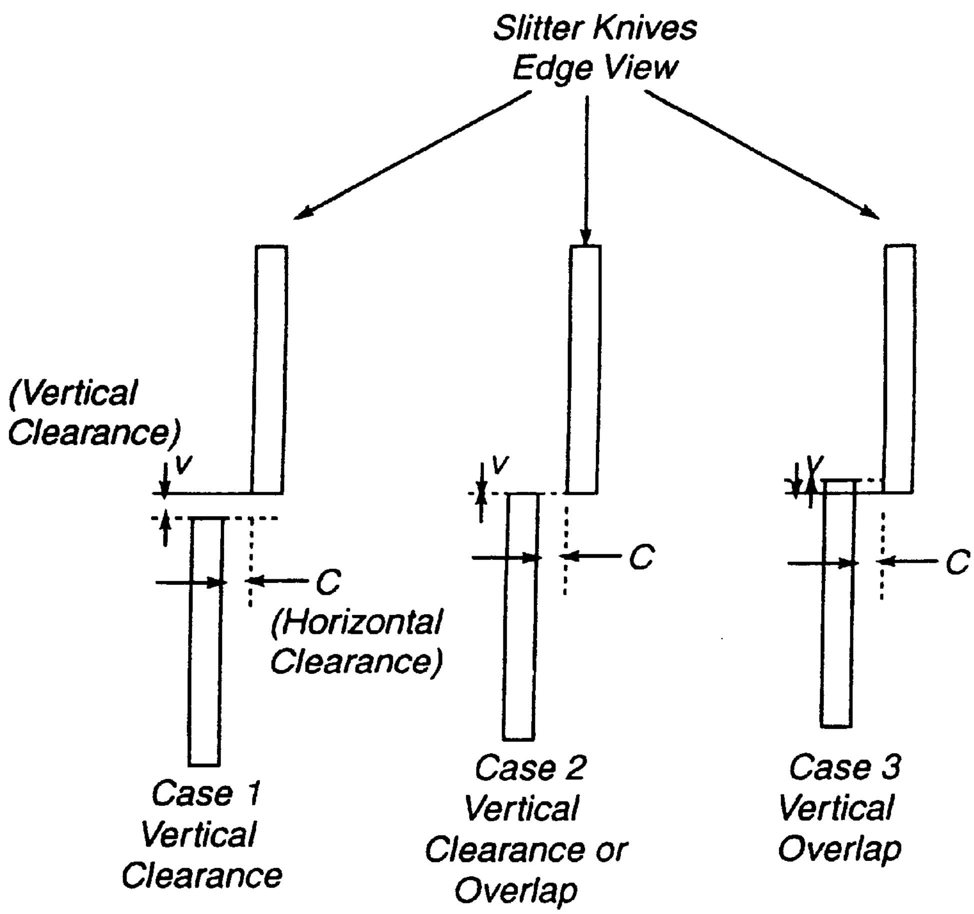
FIG. 3 illustrates the adjustment of horizontal and vertical clearance between opposing knives.

Another important factor in producing a quality slit edge is the vertical positional relation of the top and bottom knives. The correct vertical position depends on the strip gauge, its tensile strength, the horizontal clearance and the condition of the equipment. FIG. 3 illustrates vertical arbor position resulting in vertical clearance, no vertical clearance and vertical overlap. A general rule in setting the vertical position of the knives is to bring the arbors together until a cut is produced, then close them slightly more to compensate for such factors as variation in strip thickness, condition of the bearings, tolerance in the arbor position device, arbor deflection, knife wear and other system variables.

Figure 4:
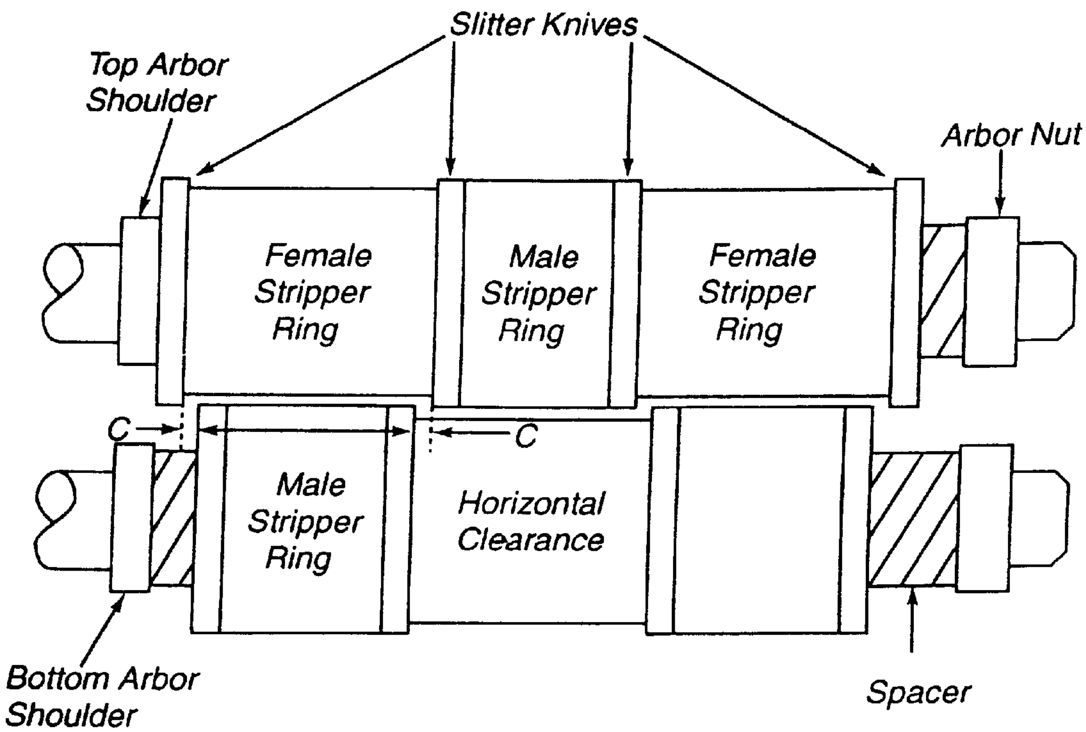
FIG. 4 illustrates a typical male-and-female type arbor setup.

FIG. 4 illustrates the use of strippers which have the following functions: (1) forcing ("stripping") the slit mult from between the knives as the slit mult leaves the slitter head; (2) supporting the strip between the knives so that it is held flat during slitting and (3) in some machines, doubling a pinch rolls to drive the material through the arbors.

A more detailed discussion of general concepts related to slitting, as well as to computer design tool arrangements used in conjunction with the same, may be found in U.S. Pat. No. 5,574,890 to Rackoff et al., herein incorporated by reference as if set forth in its entirety herein.

2. The Present Design Tool

Throughout the instant disclosure, it is to be understood that the term "edge conditions" is intended to relate to the condition or conditions present on a strip edge subsequent to cutting. The term "edge conditions" should also be understood to be interchangeable with "edge condition", in view of the possibility of interpreting the state of a cut strip edge as a plural set of "conditions" or as an overall "condition".

The disclosure now turns to a discussion of a design tool that might be utilized in accordance with at least one presently preferred embodiment of the present invention. It is to be understood that the design tool presented herebelow is provided merely as an example and contains components which, either individually or in aggregate, can easily be interchanged for other components providing similar functions.

It is also to be understood that the design tool presented herebelow can be used conjunctively with other design tools configured for other purposes in slitting. For instance, it is conceivable for the functions of the design tool discussed herebelow to be integrated with those of the design tool described in prior U.S. Pat. No. 5,574,890, to effectively result in a tool that can provide both a predictive indication of slit width variation and a predictive indication of edge conditions.

Figure 5:
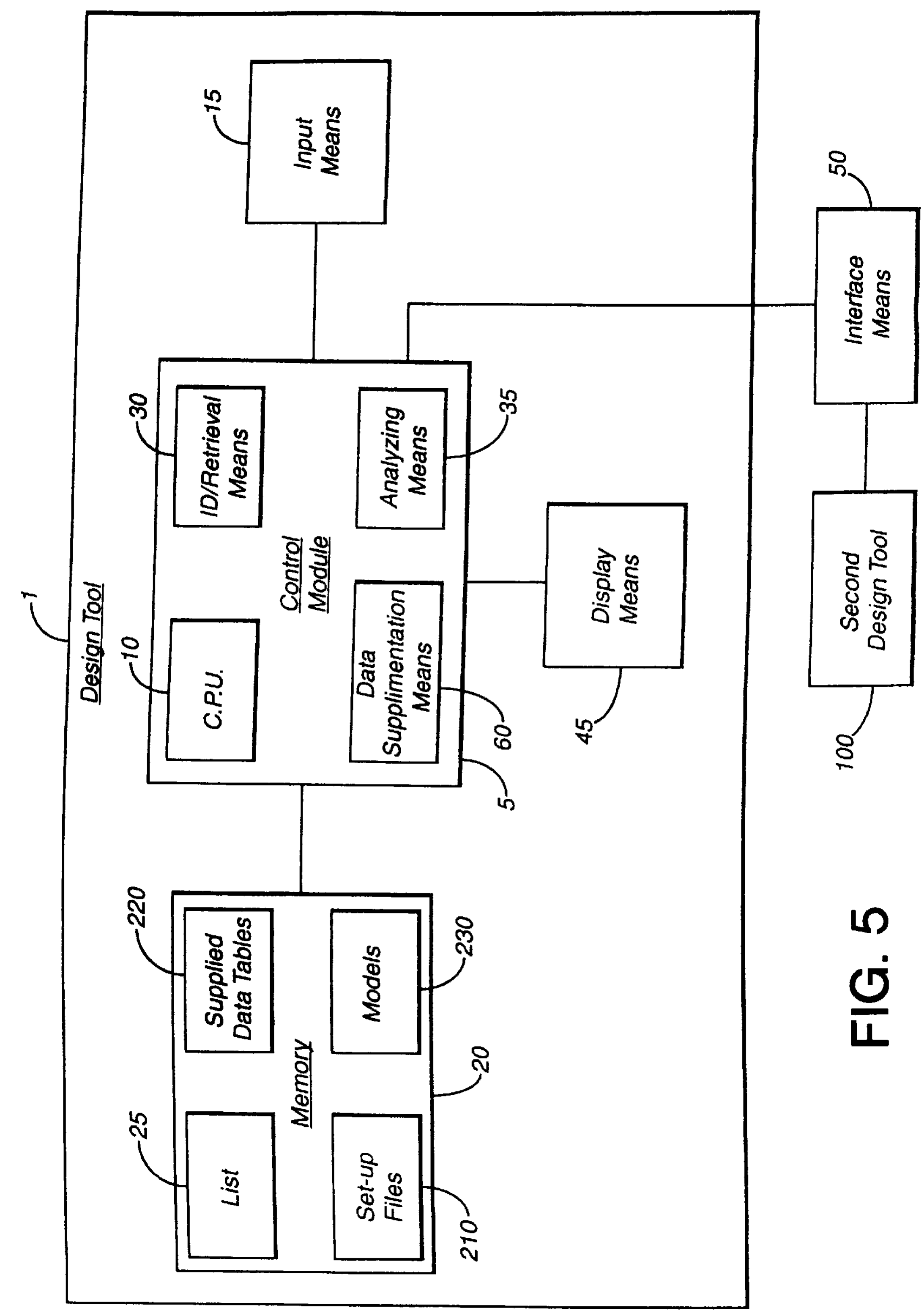
FIG. 5 illustrates an embodiment of the present design tool.

Referring to FIG. 5, a design tool 1 comprises a control module 5. Control module 5 preferably comprises a central processing unit 10. Design tool 1 also comprises an input means 15 in communicative connection with control module 5 for entering data and/or commands. Input means 15 may, for example, comprise a keyboard, a mouse and/or instrumentation for automated input of data. Such an automated instrument may, for example, comprise a measuring device or devices for measuring slit width, horizontal clearance, arbor position, vertical clearance and/or arbor deflection as known in the art. Design tool 1 further comprises a memory 20 for storing data entered via input means 15. A possible embodiment of the source code for operation of one embodiment of design tool 1 is included in Appendix A of U.S. Pat. No. 5,574,890. This embodiment of source code is designed for use in the WINDOWS operating system of Microsoft Corporation. However, it is to be understood that essentially any appropriate source code may be utilized without departing from the spirit and scope of the present invention.

In operation of design tool 1, data sets comprising sets of values of system variables are entered via input means 15. As used herein, the phrase "system variables" refers to variables or parameters potentially affecting edge conditions. Each of the sets of values of system variables preferably corresponds to sets of values of system variables as have occurred in an actual slitting run performed on a single, identified machine (slitter head). The edge conditions experienced under the conditions of each of the sets of values of system variables is also entered. Examples of system variables potentially affecting edge conditions can be found within the broadly defined categories of material properties, knife thickness and sharpness and knife settings. Several specific parameters will be discussed in more detail herein.

In accordance with at least one presently preferred embodiment of the present invention, edge conditions could be expressed in a qualitative manner or a quantitative manner, or both. Some quantitative variables relating to edge conditions are discussed in previously filed patent applications assigned to Asko, Inc. For example U.S. Patent Application Serial No. 08/588,625, entitled "Method and Apparatus for Monitoring and Inspecting Strip Edge" and published as PCT International Publication No. WO 97/27968, discusses the quantitative dimensions of shear angle and burr height. Additionally, PCT International Publication No. WO 96/03245, entitled "Edge Inspection System", which has also been patented as U.K. Pat. No. 2,304,307, discusses the slit-to-shear ratio as another quantitative parameter relating to strip edge. These patent publications are all hereby incorporated by reference as if set forth in their entirety herein and can be relied upon in providing illustrative examples of the types of quantitative parameters, relating to edge conditions, that can be employed in accordance with at least one presently preferred embodiment of the present invention.

If a qualitative record of edge conditions is relied upon, as will be discussed later in this disclosure, it is conceivable to apply, to each of several qualitative or subjective types of edge conditions, a numerical or other designation that conveniently references a given type of edge condition.

Design tool 1, thus, provides a means for creating a historical record of qualitative and/or quantitative edge conditions experienced under specified conditions as defined, at least in part, by the set of system variables. Such a historical record may be maintained for one or more slitting heads.

The sets of values of system variables and the corresponding edge conditions experienced (qualitative or quantitative) are stored in memory 20. Preferably, the data sets are stored in a list 25 within memory 20. Preferably, each set of values of system variables and the corresponding edge conditions experienced under those conditions are linked within a single data set stored in list 25, enabling identification and retrieval of both the values of the system variables and the corresponding edge conditions experienced upon an appropriate command to control module 5. This result may be accomplished by creating appropriately dimensioned arrays of data sets as known in the computer arts.

Figure 7:
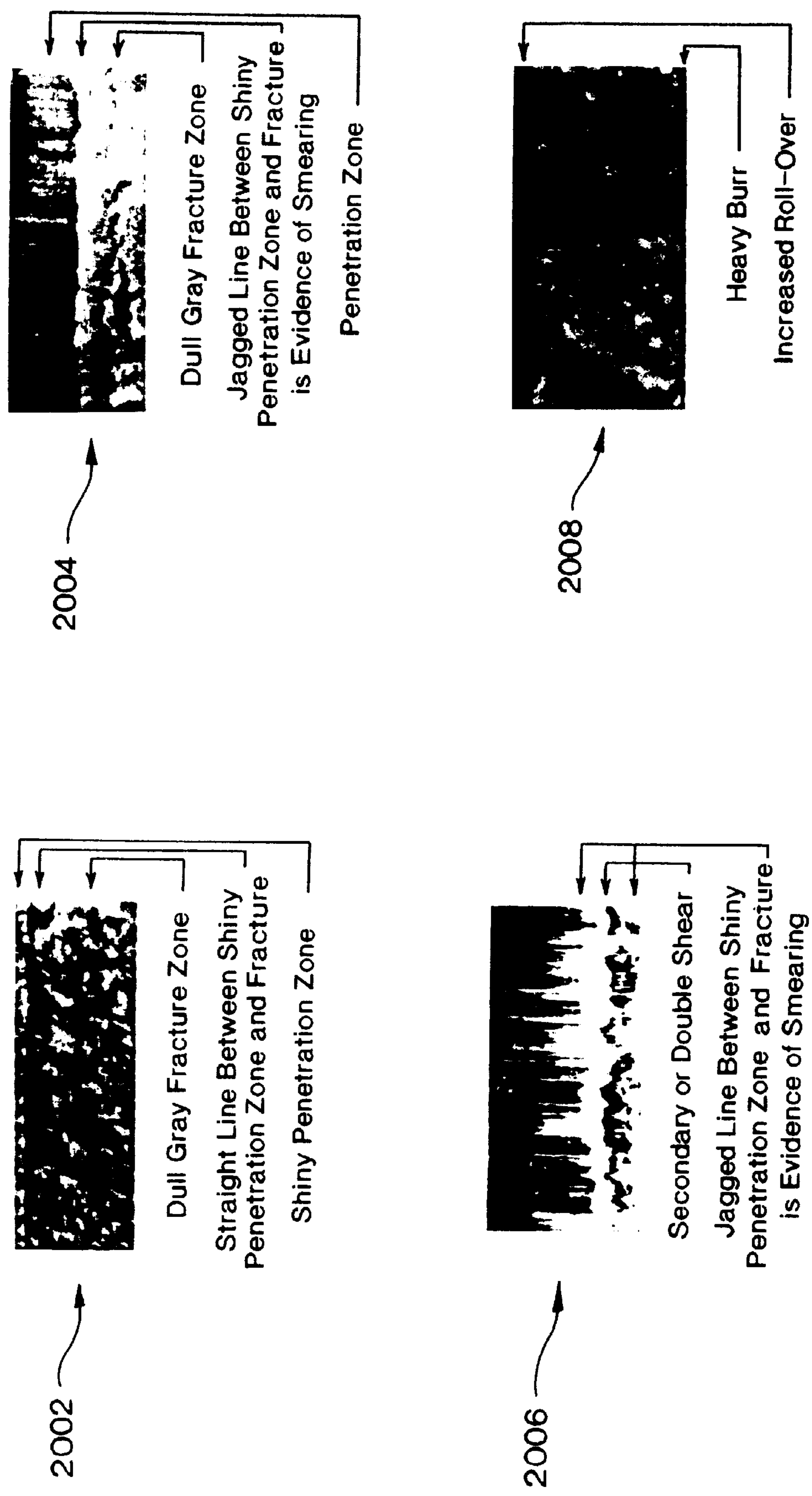
FIG. 7 illustrates several types of edge conditions, expressed qualitatively as photographic images.

FIG. 7 illustrates four types of qualitatively expressed edge conditions that may be employed in accordance with at least one presently preferred embodiment of the present invention. Accordingly, indicated at 2002 is a representation of what may be designated as an "ideal slit edge". Respectively indicated at 2004, 2006 and 2008, on the other hand, are photographic representations of edge conditions that may be designated as "knives set too tight", "excessively tight knives" and "knives set too far apart". Each of the four qualitatively expressed edge conditions, as shown in FIG. 7, includes a brief verbal description of the visual characteristics of each of the four qualitative expressions of edge conditions. "Excessively tight", for the purpose of the present discussion, should be taken to be indicative of a degree of tightness (i.e., closeness, or reduced horizontal clearance) that is towards an extreme of tightness, while "knives set too tight" should be taken to be indicative of a degree of tightness that is somewhat less severe than in the case of "excessively tight". In each case, these verbal descriptions refer to the degree of horizontal clearance between knives of opposing arbors.

Thus, the "ideal slit edge" 2002 may be understood as being characterized by a dull gray fracture zone, a shiny penetration zone and an essentially straight line between the shiny penetration zone and the fracture zone. The condition of "knives set too tight" (2004), on the other hand, might be characterized by a jagged line between the shiny penetration zone and the fracture zone, the jagged line being known in the art as evidence of smearing. The condition of "excessively tight knives" (2006) might be characterized similarly by a jagged line between the penetration and fracture zones, and also by evidence, known well generally to those of ordinary skill in the art, of a secondary or double shear. Finally, the condition of "knives set too far apart" (2008) might be characterized by evidence of a heavy burr and of increased roll-over, both of which will generally be well appreciated by those of ordinary skill in the art.

Although only four types of qualitative edge conditions are illustrated, it is conceivable, within the scope of the present invention, to provide for many more, bounded only by that which would be within the purview of one of ordinary skill in the art.

Preferably, each qualitative edge condition may be assigned a numerical or other designation, as discussed above (e.g., 1, 2, 3, etc.). Such numerical or other designations may be incorporated into the input and/or output data sets employed. For the purpose of providing output (as discussed in more detail later in this disclosure), it is conceivable either to provide the user with the same numerical or other designation, with a verbal indication of the qualitative edge condition (e.g., "knives set too tight"), and/or with a photographic representation such as one of those shown in FIG. 7. In view of the developments in multimedia computer technology in the 1990's, the production of a photographic image for this purpose on a computer monitor would appear to be a relatively simple task. The photographic images concerned could conceivably be stored on a CD-ROM or other appropriate medium and could be called up with essentially any suitable protocol or algorithm capable of performing such a task.

An example of a portion of a data list for a particular machine or slitter head is provided in Table 1. A separate list 25 as set forth in Table 1 is preferably created for each slitter head of interest. In the present example, the rightmost column is designated with the heading "Standardized Edge Condition". As just discussed, the data found in this column could preferably be numerical in nature, to indicate a given qualitative edge condition.

TABLE 1

| Date (1998) | Horizontal Knife Clearance, in. | Ultimate Tensile Strength, PSI | Vertical Knife Clearance, in. | Standardized Edge Condition (#) |
|---|---|---|---|---|
| 7/1 | .003 | 50000 | .001 | 1 |
| 7/5 | .001 | 50000 | .001 | 4 |

In Table 1, the system variables in each data set include horizontal knife clearance, ultimate tensile strength and vertical knife clearance. Each data set may also include identifying parameters other than system variables affecting edge conditions, such as the date of the corresponding slitting run and the customer order number. As illustrated in Table 1, the date of each slitting run is included in each data set with the corresponding set of system variables. If the customer is identified in the data sets, then design tool 1 enables analysis of slitting runs performed on a per-customer basis.

Values of substantially each system variable known to affect edge conditions may be included in each data set. These system variables include, but are not limited to the following: material thickness, theoretical mult width, tensile strength, horizontal clearance, yield strength, vertical clearance, strip thickness variability, material ductility, position of a mult on the arbor, knife diameter, knife thickness, knife edge condition (for example, (i) when reground, (ii) quality of grind, (iii) surface finish, (iv) knife metallurgy, and (v) knife tolerances), spacer diameter, stripper ring conditions (for example, (i) stripper ring material hardness and (ii) the stripper ring mechanics/physical characteristics), uncoiler tension, recoiler tension, slitter speed synchronization, system tension (tension leveler), pass line configuration (that is, the positional relationship between, for example, the uncoiler, the arbor and the recoiler), speed of operation, condition of spacers, condition of slitter head, condition of the arbor lock-up system (for example, the condition of the nut or hydraulic nut, if applicable), temperature of tooling and material, spacer materials (for example, steel, aluminum or ceramic), arbor deflection during slitting, system lubricity (that is, if a lubricant used, and, if used, what type), strip shape and tooling tolerances. In cases of system variables such as the knife edge condition, which require subjective judgment, an operator is preferably provided with several specified conditions/values for such system variables from which one condition/value is chosen.

Although it may be preferable in certain cases to include values of as many system variables known to affect edge conditions as available, very good results are achievable upon storing data sets comprising the material thickness, the mult width, the material tensile strength and horizontal clearance. Preferably, the position of the mult or slit on the arbor is also considered.

Figure 6:
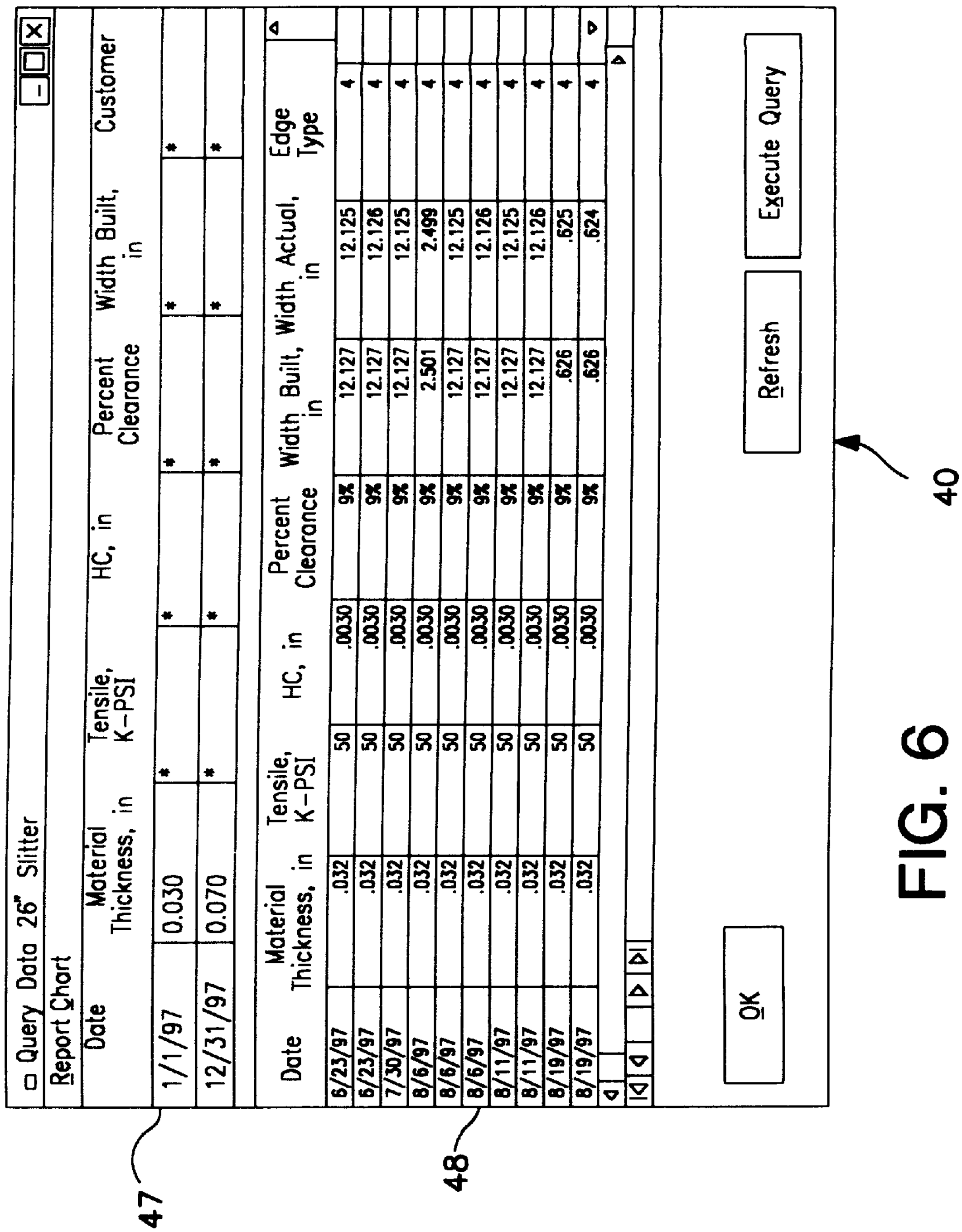
FIG. 6 illustrates an embodiment of a query screen for use in the present invention.

In preparing to set up an arbor for a future slitting run, the operator first uses design tool 1. In that regard, control module 5 further comprises a means for identifying/retrieving data 30 and a means for analyzing data 35. Preferably, upon issuance of an appropriate command (for example, "query") to control module 5, a query screen 40 as illustrated in FIG. 6 is displayed upon a display means 45, such as a CRT. The particular query screen 40 illustrated in FIG. 6 and other screens discussed hereafter are designed for use in the WINDOWS operating system.

Referring to FIG. 6, query screen 40 preferably comprises a data entry area 47 in which an operator may enter data comprising ranges of values of system variables. The operator may choose a range as broadly or as narrowly as desired. For example, if the operator wishes only to identify and analyze data corresponding to slitting runs in which the material had a tensile strength of 50 kpsi, the operator may enter 50 kpsi as both the upper and lower limits of the tensile strength system variable in the operator's query. Likewise, the operator may extend his or her query to encompass all the data available for a particular system variable upon entering a range known to encompass all the data for that system variable. As illustrated in the embodiment of the present invention set forth in FIG. 6 (for the tensile strength, horizontal clearance and other entries), a code character such as an asterisk is preferably defined to indicate that the operator desires the upper and lower limit of a particular system variable to be unbounded.

The query set forth in FIG. 6 will, therefore, identify all data sets corresponding to slitting runs occurring between the dates of Jan. 1, 1997 and Dec. 31, 1997 in which the material thickness was between 0.030 and 0.070 in. The query ranges for all other system variables shown are unbounded.

Alternatively, the values of the system variable for a future slitting run may be entered and a query may be executed using predefined ranges of system variable stored in memory 20. Preferably, these predefined ranges of system variable are identified empirically for a particular slitter head. In general, the more sensitive the edge conditions are to a particular variable (over a particular range of that variable), the narrower the preferred query range for that variable should be.

Examples of empirically specified query ranges for the system variables material thickness, tensile strength and horizontal clearance are provided in Table 2 below. In Table 2, horizontal clearance is expressed as a percentage of material thickness.

TABLE 2

| Material Thickness (in.) | Tensile Strength (kpsi) | Horizontal Clearance (%) |
|---|---|---|
| 0.0 to 0.0249 | 0.0 to 39.99 | 0.0 to 7.99 |
| 0.025 to 0.0639 | 40.0 to 64.99 | 8.0 to 11.99 |
| 0.064 to 0.1009 | 65 to 100.99 | 12.0 to 17.99 |
| 0.101 to 0.1499 | 101 to 200 | 18.0 to 24.99 |
| 0.15 to 0.2009 | | 25 and above |
| 0.201 to 0.2759 | | |
| 0.276 to 0.50 | | |

Referring to Table 2, if the following values of the material thickness, tensile strength and percent horizontal clearance, respectively, for a future slitting run were entered: 0.13 in., 50 kpsi, 22% and 30 in., the respective query ranges would be as follows: 0.101 to 0.1499 in., 40.0 to 64.99 kpsi and 18.0 to 24.99%.

Predefined query ranges may also be specified simply by evenly dividing the full range over which a particular system variable is expected to vary into even intervals (query ranges). For example, if tensile strength is expected to vary between 50 and 300 kpsi, ten query ranges of 25 kpsi each may be specified. The specified query ranges can, of course, be changed in light of results obtained.

Upon completion/identification of appropriate query ranges, a query command is issued to command module 5 to identify/retrieve data from list 25 within the query ranges. Design tool 1 may identify/retrieve only data corresponding to actual edge conditions experienced for data sets in which the values of each system variable falls within the specified query ranges, but, preferably, the data comprising each such set of system variables as well as the edge conditions corresponding thereto are identified/retrieved and are displayable in view area 48 as shown in FIG. 6. In this manner, the operator may scroll/browse through identified data sets. As shown, the column designated “edge type” contains numerical designations corresponding to qualitatively expressed edge conditions.

Once the edge conditions experienced (and the data sets) within the query ranges are identified, analysis of the data corresponding to the edge conditions experienced is executed by a means for analyzing data 35 included in control module 5. Preferably a mathematical and/or statistical analysis is performed, appropriate types of which are discussed later in this disclosure. Preferably, incomplete data sets (or data sets in which a value of one or more of the system variables for which a query range has been defined are not present) are not considered in the analysis to determine a predictive indication of edge conditions.

Figure 8:
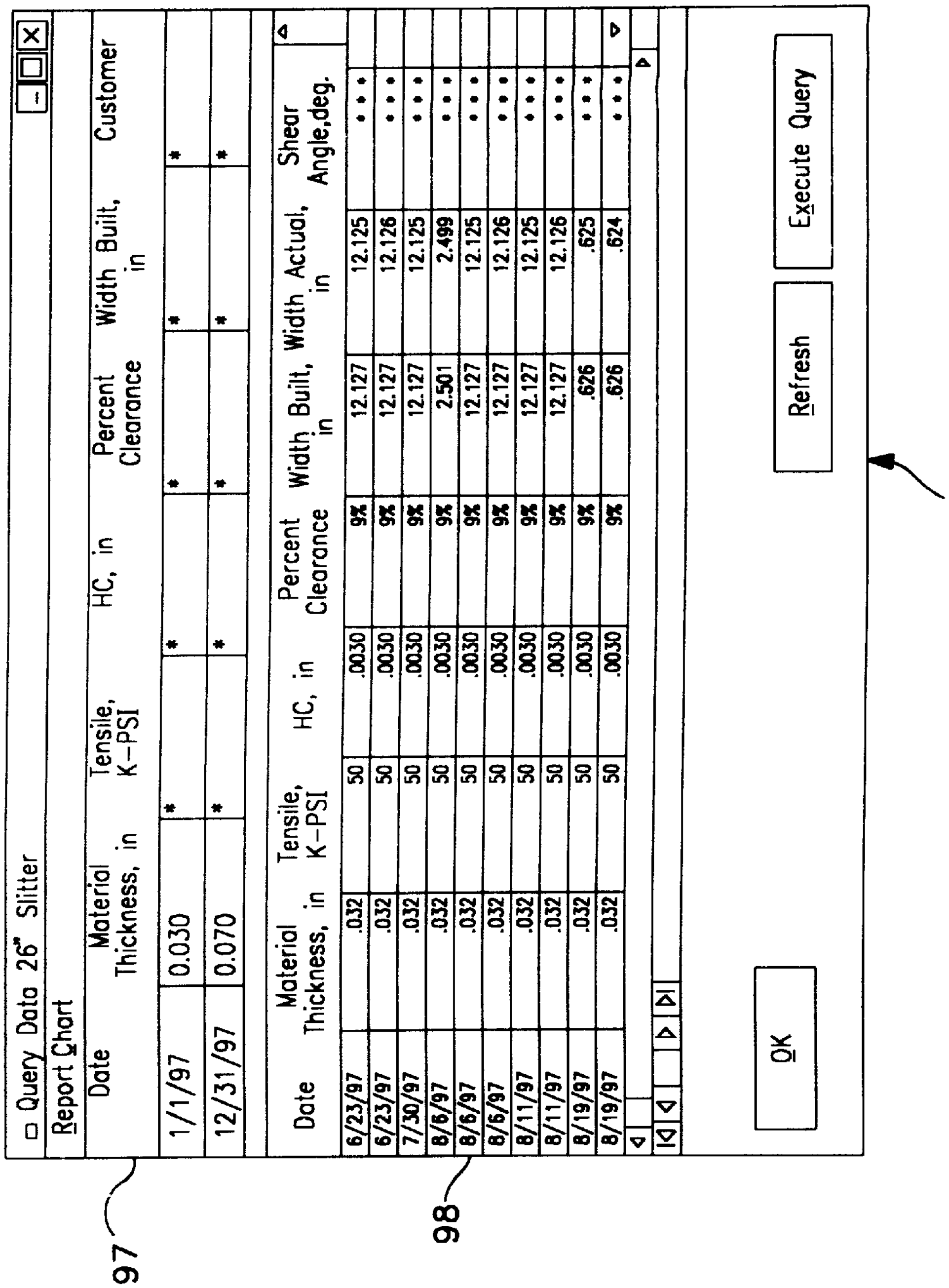
FIG. 8 illustrates a second embodiment of a query screen for use in the present invention.

FIG. 8 illustrates an alternative arrangement, in which data sets include a quantitative variable relating to edge conditions. Particularly, FIG. 8 illustrates, similarly to FIG. 6, a query screen 90 that itself includes a data entry area 97 and a data display area 98. Preferably, the embodiment illustrated in FIG. 8 will work in essentially the same manner as that illustrated in FIG. 6, the difference being that the quantitative variable of shear angle (e.g. expressible in degrees) is provided instead of the numeric designations relating to qualitatively expressed edge conditions. Thus, the column corresponding to shear angle in data display area 98 may preferably contain a value for shear angle corresponding to each of the listed slitting runs.

As will be discussed more fully below, it is conceivable to provide the user with either a qualitative prediction of expected edge conditions, a quantitative prediction, or both. For a qualitative prediction, a photographic image will preferably be generated, such as one of those shown in FIG. 7. For a quantitative prediction, it is conceivable to produce the value of one or more desired quantitative objective parameters, such as shear angle, burr height and/or slit-to-shear ratio.

Preferably, and as will be described and illustrated more fully below, the predicted edge condition as determined and displayed upon display means 45 is used to provide to the user an indication or estimate of the edge conditions to be expected when the system variables of a particular slitting run are within the specified ranges. Then, an arbor setup is preferably built that accounts for the predicted edge conditions.

Thus, design tool 1 preferably includes means for determining such arbor setup, including an arbor loading sequence. This result may be accomplished in several manners. First, design tool 1 can be placed in communicative connection with at least a second, independently operative, computer-based design tool 100 that operates to determine an arbor setup from available tooling, but does not provide a predictive indication of edge conditions. An example of such a design tool is the CASS design tool available from the American Shear Knife Division of ASKO, Inc.

Design tool 100 may share completely the same resources (for example, control module 5, input means 15, memory 20, and display means 45) as design tool 1, or, alternatively, design tool 100 may comprise its own resources and be connected to design tool 1 via an interface means 50, as in a network system. The latter alternative is illustrated in FIG. 5.

Reference to second design tool 100 is made herein for purpose of the present description only. It is understood by one skilled in the art that design tool 1 and design tool 100 may be viewed and/or constructed as a single design tool. In that regard, design tool 1, may itself include all means necessary for determining an arbor setup and, thus, not require independently operative design tool 100.

Figure 9:
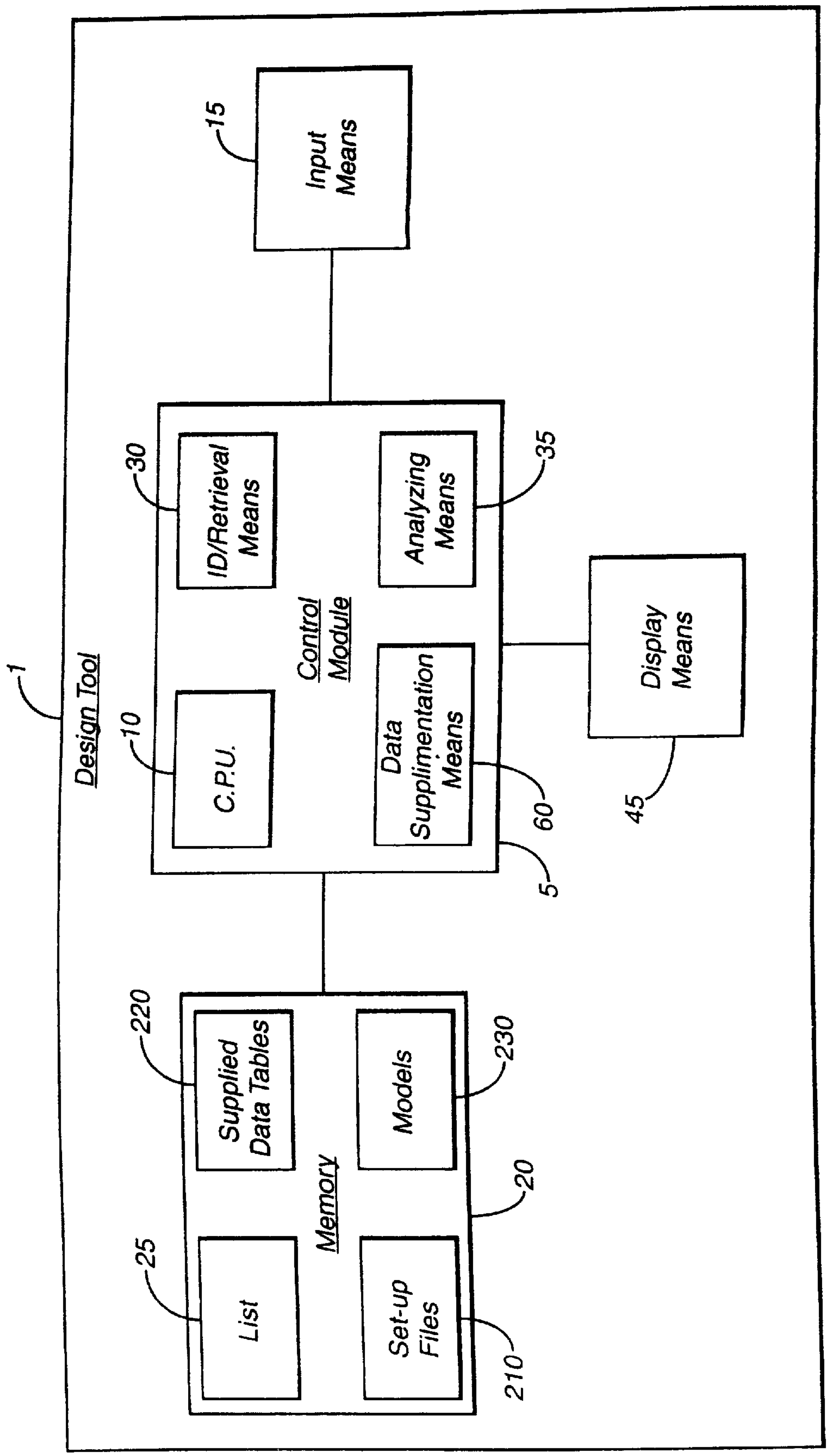
FIG. 9 illustrates an embodiment of the present invention in which the design tool determines an arbor setup.

FIG. 9 illustrates an embodiment of a design tool 1 in which design tool 1 either fully incorporates all means necessary to determine an arbor setup, or, in which design tool 1 communicatively operates with independently operable design tool 100 sharing each of memory 20, control module 5, input means 15 and display means 45. In the latter case, all executable files and non-executable files of each of design tool 1 and design tool 100 are preferably stored in memory 20. The following discussion describes this latter embodiment.

In using the design tool 100, relevant system variables are input via input means 15, and design tool 100 determines an appropriate arbor loading sequence to match the entered data. One embodiment of this process will be described referring to FIGS. 10A, 10B and 10C.

Figure 10:
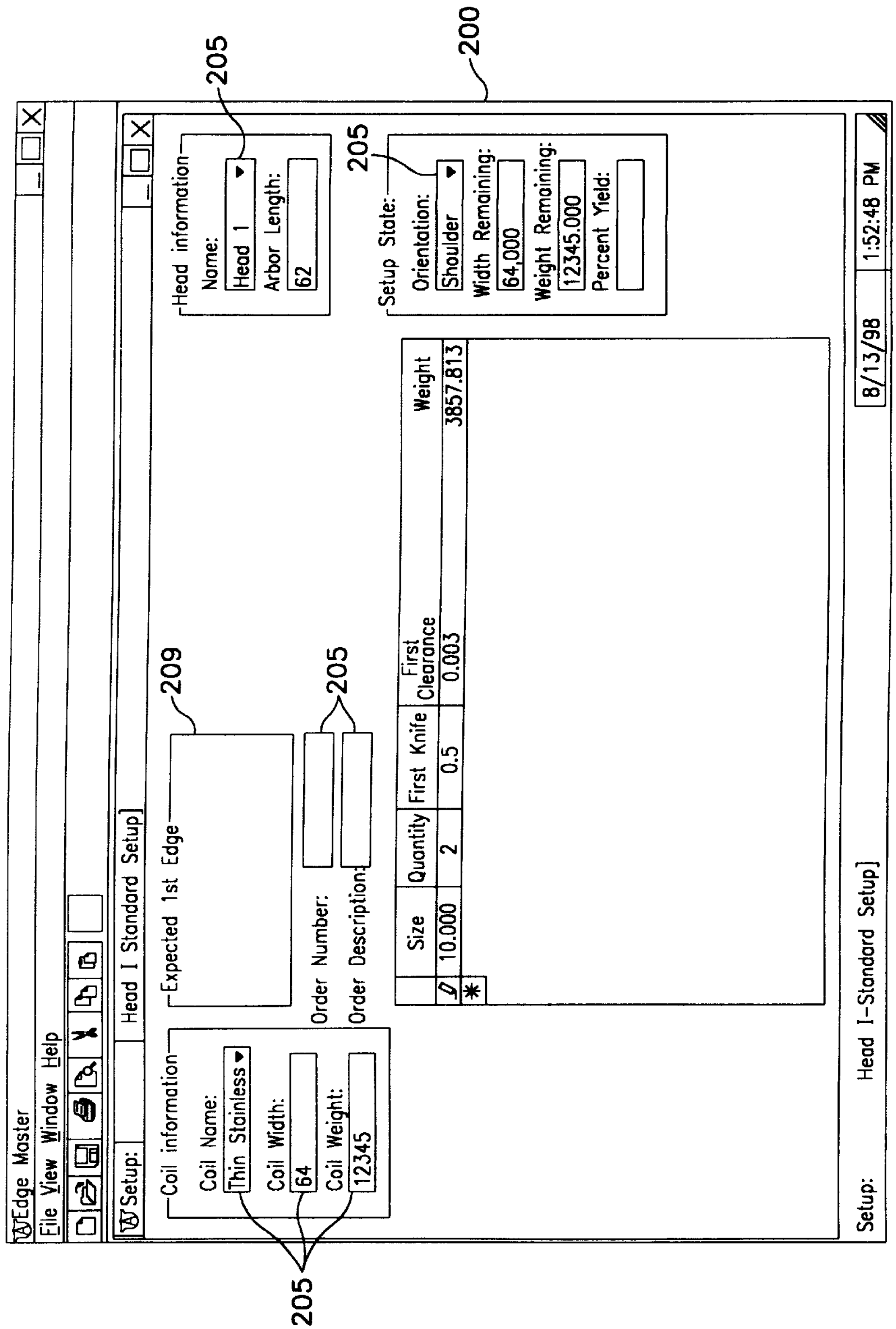
FIG. 10 illustrates an embodiment of a data screen for use in an embodiment of the present design tool in which an arbor setup is calculated.

FIG. 10 illustrates an initial setup screen 200 of design tool 100 (or design tool 1), which is displayed upon display means 45. Setup screen 200 facilitates creation of a setup file 210 in which system variables and other parameters, entered via input means 15, are stored in memory 20.

Setup screen 200 includes several data areas 205 for entrance of identifying parameters such as an order number and an order description. Setup screen 200 also comprises a means for selection of the appropriate slitter head and setup type (e.g. “shouldered” or “centered”), which may comprise pull-down menus. Setup screen 200 further comprises one or more data areas 205 for entrance/calculation of the values of system variables. The system variables set forth in setup screen 200 include coil width and coil weight. Of course, other appropriate variables may also be included. Preferably, default values are set for some of the parameters and/or system variables which do not often vary between slitting runs. Such parameters include the arbor length, the maximum coil width, the setup type (for example, shouldered or centered) and the maximum slit width. Preferably, the design tool 100 will permit the user to change such default parameters, as needed.

Figure 11:
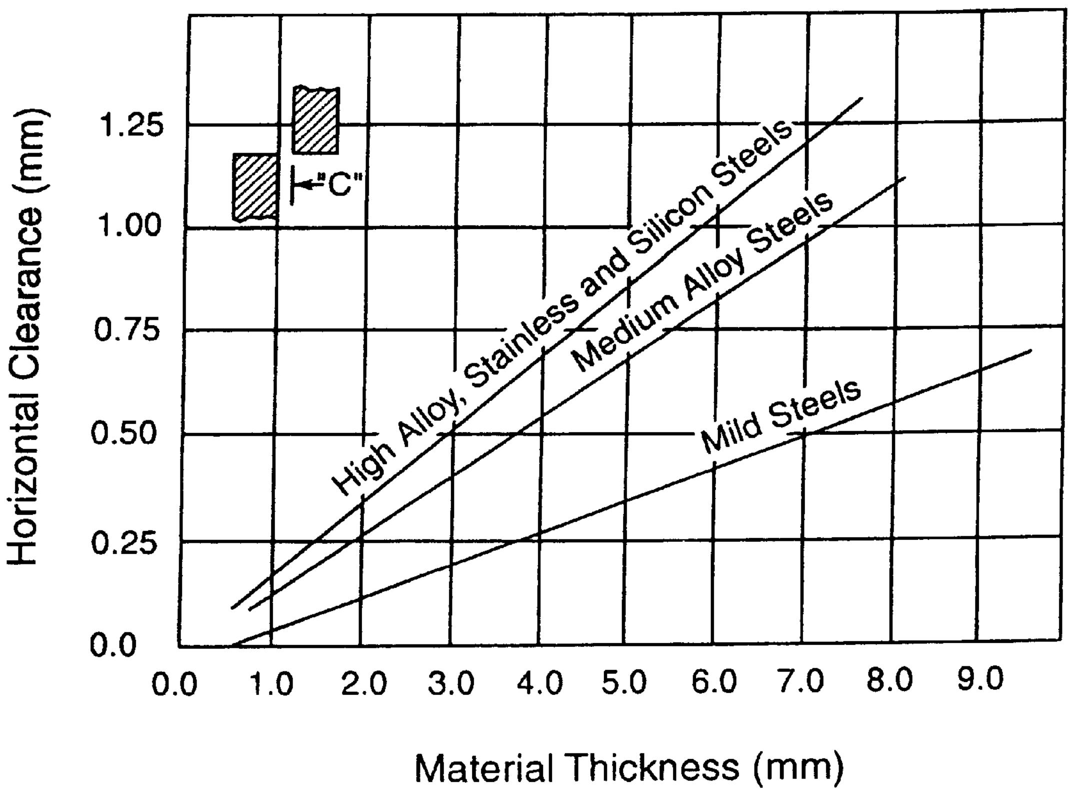
FIG. 11 illustrates a model for calculating horizontal clearance from material thickness and material tensile strength.

In the case of the system variable, horizontal clearance, it is possible to calculate a value therefor from 25 other system variables. For example, the horizontal clearance can be calculated from the material thickness and the tensile strength using models/formulas known in the art. An example of one such model is illustrated in FIG. 11. As illustrated in FIG. 10, master coil data, including the master coil width and the master coil weight are preferably entered via input means 15.

It is also conceivable to enter a number of system variables relevant to the arbor setup, the knife thickness, and possibly others, via input means 15. Upon entrance/calculation of a predetermined number of system variables in any suitable manner (e.g., the material thickness, the theoretical slit width, the tensile strength and the horizontal clearance), design tool 100 communicates with design tool 1 to acquire a predictive indication of the edge conditions for use in determining the arbor setup. In effect, design tool 1 may act as a subroutine of design tool 100.

As shown in FIG. 10, the expected edge conditions may be called up in the form of an image, as described heretofore. Although not shown in FIG. 10, it is also possible to include a brief description of the edge condition in question as well as the numeric indicator (e.g. 3 for "Ideal Edge"). Alternatively or in addition, the edge conditions could be displayed similarly in a quantitative manner (e.g. by displaying the shear angle, burr height, or slit-to-shear ratio).

Preferably, the operator is given the choice of accepting or altering the expected edge conditions in creating an arbor setup using design tool 100. The operator is preferably also provided a choice to view the details of a query executed by design tool 1 (as such details are discussed above). The manner of prompting the operator at this point and of accepting commands may be accomplished in essentially any suitable manner (e.g. via a small pop-up interface screen as known in the computer arts).

The values of the system variables entered into or calculated by design tool 100 may be imported into list 25 of design tool 1 to be used as at least part of a data set of list 25. Therefore, design tool 1 is preferably adapted to access stored setup files 210 of design tool 100 (that is, a file comprising the values of system variables input for use by design tool 100 and corresponding to particular slitting runs) upon provision of the filename of setup files 210.

If a system variable such as the horizontal clearance is calculated by design tool 100 or design tool 1, the calculated system variable is not an independent variable, and, thus is preferably not considered in a query of system variables using design tool 1. Preferably, therefore, system variables that are calculated using a design tool (via an equation/model using other system variables) are flagged as such upon storage of the corresponding set of system variables.

As will be appreciated from the above description, the accuracy of the predictive indication of the edge conditions determined by design tool 1 increases as additional data sets are stored in list 25. Preferably, such additional data sets correspond to actual slitting runs in which design tool 1 was used in determining the arbor setup.

However, even after storage of numerous data sets, there may be certain ranges of a particular system variable over which no data is available. This problem may be alleviated, at least for quantitative variables, by providing control module 5 with a means for supplementing list 25. Data supplementation means 60 may comprise, for example, a means for performing an interpolation/data fit between/among adjacent sets of system variables. For this purpose, adjacent sets of system variable are defined as sets of system variables that have the equivalent values for all but one of the system variables therein.

Preferably, supplemented data tables 220, comprising supplemental data sets as described above are stored within memory 20 and can be accessed for queries by design tool 1.

Most preferably, supplemental models 230 are created based upon the data sets stored in list 25. Two examples of supplemental models 230 are provided in FIGS. 12A and 12B.

Models are preferably developed using data fitting methods such as regression models (for example, a linear regression or a least squares method) upon collection and storage of sufficient data in list 25 to provide a statistically satisfactory correlation factor/"goodness of fit" between such a model and the actual data as known in the statistical art. Models 230 are thereby produced to which reference can be made to estimate edge conditions, at least quantitative ones, to be experienced in future slitting runs.

As mentioned previously, the quantitative variables relating to edge conditions, and that may be utilized in the aforementioned data fitting methods, include, but are not limited to, shear angle, burr height and slit-to-shear ratio. Appropriate fitting methods for quantitative variables would appear to be well known to those of ordinary skill in the computer arts and will not be described in any further detail herein.

It is also conceivable, in accordance with at least one presently preferred embodiment of the present invention, to apply mathematical data fitting methods to qualitatively expressed edge conditions. Although such an undertaking might appear to be difficult in view of what might appear to be the subjective nature of such edge conditions, it has been determined that data fitting methods would be possible in this context, as well. For instance, if it is to be assumed that the computer memory will contain a given number of qualitatively expressed edge conditions (e.g. such as those illustrated in FIG. 7), and as more and more data sets are entered into the memory as increasing numbers of slitting runs are performed, it will be appreciated that a significant historical record can be developed from which an accurate predictive determination of qualitatively expressed edge conditions can be determined. Insofar as the data sets will encompass a given number of variables, it will be appreciated that, over time, it will be come increasingly easier to assess the sensitivity of the types of qualitatively expressed edge conditions to the different variables. From this, it will be possible to determine the expected edge condition, qualitatively expressed, for given system variables entered prior to the start of a slitting run. A practical example of the predictive determination of a qualitatively expressed edge condition is provided further below, and the possibility of utilizing fit methods in such a context will be better appreciated from that example.

Preferably, for fitting methods in the context of either of the "quantitative" or "qualitative" scenarios discussed above, one or more n-dimensional supplemental models 230 of the data sets stored in list 25 are created wherein n is the number of independent system variables represented in a model 230. Preferably, n is equal to the number of independent system variables enterable in each data set. Preferably, data sets in which a value of one or more of the n system variables are missing (that is, incomplete data sets) are not considered in creating n-dimensional model 230.

It should be appreciated that, in accordance with at least one embodiment of the present invention, it is possible to employ a hybrid arrangement in which both qualitative and quantitative expressions of edge conditions are manipulated by the design tool and predictively provided to the user. Particularly, it is conceivable not only to provide solely a photographic image corresponding to a given qualitative edge conditions or provide solely quantitative data relating to edge conditions, but a hybrid representation of both (e.g. on a display screen such as that illustrated in FIG. 10). It is conceivable, also, for the user, in such a situation, to choose which variable or variables he or she would like displayed. The computer-related arrangements for enabling such choices would appear to be well-known to those of ordinary skill in the art and will not be discussed in any further detail herein (for example, "push buttons" on the screen, "pull-down menus", etc.).

It should be appreciated that the present invention, in accordance with at least one presently preferred embodiment, need not necessarily be restricted to use in conjunction with strip edge conditions. For instance, the concept of providing a predictive qualitative assessment and/or quantitative assessment in the context of slitting could also be used in conjunction with other parameters that might lend themselves well to both qualitative and quantitative assessment, such as knife edge condition or edge burr conditions.

The disclosure now turns to a discussion of a practical example of a design tool and its functioning in accordance with at least one presently preferred embodiment of the present invention.

Generally, it will be appreciated that at least one presently preferred embodiment of the present invention broadly contemplates, in metal slitting, a design tool for predictively indicating expected edge conditions of slit metal. The following example, in turn, relates to an embodiment in which expected edge conditions are indicated qualitatively (e.g., in the form of an image as illustrated in FIG. 7).

Preferably, as may be appreciated with reference to FIG. 6, a numerical value may be assigned to each of a predetermined number of qualitatively expressible edge conditions, such as those types of edge conditions described and illustrated heretofore with respect to FIG. 7. For the present discussion, it may be assumed that the following numbers can be assigned to the four types of edge conditions shown in FIG. 7: for "ideal" (indicated at 2002 in FIG. 7)—3; for "knives set too tight" (2004)—2; "excessively tight knives" (2006)—1; and "knives set too far apart" (2008)—4. It will be appreciated that the verbal descriptions just given refer in general to the horizontal clearance provided between knives of opposing arbors. Furthermore, it will be appreciated that the four assigned numbers (1, 2, 3, 4) follow a general progression from knives that are excessively tight (1) to those that are too far apart (4). Again, "excessively tight", for the purpose of the present discussion, should be taken to be indicative of a degree of tightness (i.e., closeness, or reduced horizontal clearance) that is towards an extreme of tightness, while "knives set too tight" should be taken to be indicative of a degree of tightness that is somewhat less severe than in the case of "excessively tight".

Generally, the assignment of numerical designations to different types of qualitatively expressed edge conditions should preferably be carried out in such a way that the proportional sequential progression from one assigned number to the other reflects, with reasonable accuracy, a similarly proportional change in the primary system variable being regarded as the main determining factor between different types of qualitatively expressed edge conditions. Thus, the numerical values are preferably chosen to correspond sequentially, and preferably proportionally, to the variation of a chosen physical parameter or primary system variable. In the present example, the primary system variable is horizontal clearance, that is, the separation distance between knives of opposing arbors, as measured in a direction perpendicular to the central axes of the arbors. Preferably, the numbers assigned to different types of edge conditions will be sequential ordinal numbers (e.g. 1, 2, 3 . . . ; or possibly 10, 20, 30 . . . ; etc.).

It is to be understood that while, in the present example, horizontal clearance is indicated as a primary system variable that largely governs the qualitatively expressed edge conditions, there are, of course, other variables that could affect the qualitatively expressed edge conditions. Such variables have been discussed earlier in this disclosure.

Insofar as it is recognized, in accordance with at least one presently preferred embodiment of the present invention, that horizontal clearance is a system variable that can bear tremendous effect upon qualitatively expressed edge conditions, it has been determined, as a matter of convenience, that the aforementioned verbal designations used herein for the qualitatively expressed edge conditions (i.e., "ideal slit edge", "knives set too tight", "excessively tight knives" and "knives set too far apart") are very convenient designations that will be readily appreciated by those of ordinary skill in the art, even though the corresponding edge conditions could conceivably be produced by other factors.

Preferably, during arbor setup, at least one value corresponding to at least one system variable of the arbor setup is input. An example of such an undertaking has been described heretofore with relation to FIG. 10 and thus does not appear to warrant further discussion here.

Thereafter, the input value or values is compared to the value or values of at least one corresponding system variable from at least one historical (i.e., previous) slitting run.

Thereafter, at least one historical slitting run is discerned that has a value for the at least one corresponding system variable that is substantially comparable to the at least one input value. In accordance with at least one presently preferred embodiment of the present invention, "substantially comparable" can be taken to mean equivalent or nearly equivalent. Alternatively, it can be taken to mean that the historical value or values in question lies within a predetermined range that encompasses the input value. Such ranges could, if desired, be embodied by the types of "query ranges" discussed heretofore. In any case, the appropriate value or range of values utilized to determine what is "substantially comparable" can conceivably be predetermined by the operator, utilizing essentially any appropriate means (e.g., via a push-button or pull-down menu) or could even be preset in the corresponding computer program.

At this point, one will have obtained at least one numerical value assigned to the type of edge condition corresponding to the at least one historical slitting run discerned as just discussed. Preferably, the at least one numerical value will be consistent with those numerical values that have been assigned to various types of qualitatively expressed edge conditions (e.g., 1, 2, 3, 4).

Thereafter, the at least one numerical value will preferably be manipulated mathematically to produce a final numerical result, which is then preferably converted into an edge condition type that is indicated, such as via imaging, to the operator.

Preferably, the mathematical manipulation of the at least one numerical value may encompass averaging the at least one numerical value. Thence, the averaged value is preferably rounded so as to determine the expected edge condition. For this reason, it may be desirable to utilize purely ordinal numerical designations (i.e., 1, 2, 3, 4) for the various edge condition types, in order to facilitate rounding of the averaged number.

Thus, as a practical example, if, as part of the "discernment" step discussed above, 10 historical slitting runs are pinpointed that correspond to the occurrence of a particular system variable within a given range, and if the ten numerical values for edge condition, as experienced in these 10 slitting runs, include two values of "2", and eight values of "3", then an average is taken of the ten numbers to result in a final averaged numerical value of 2.8. This value of 2.8 is then rounded to the nearest integer, in this case 3, to result in the edge condition corresponding to the value of 3 being indicated to the operator. Accordingly, in this case, the edge condition indicated to the operator, via the imaging arrangement discussed heretofore or via another appropriate arrangement, is the "ideal slit edge".

Of course, the present invention, in accordance with at least one preferred embodiment, is not to be construed as being restricted to the example discussed above. Indeed, for example, it is conceivable to employ a number of different qualitatively expressed edge condition types other than four; for example, it is conceivable to employ 10, 15, 20 or even more. Further, the exercise of discerning the historical slitting runs that are to form the basis for the averaging operation or other mathematical manipulation need not be restricted to finding those historical slitting runs corresponding to a range of values for only one system variable. Two, three or even more system variables, each with predetermined query ranges or values, may be utilized to narrow the list of historical slitting runs used to predictively indicate the expected edge condition type.

Figure 12:
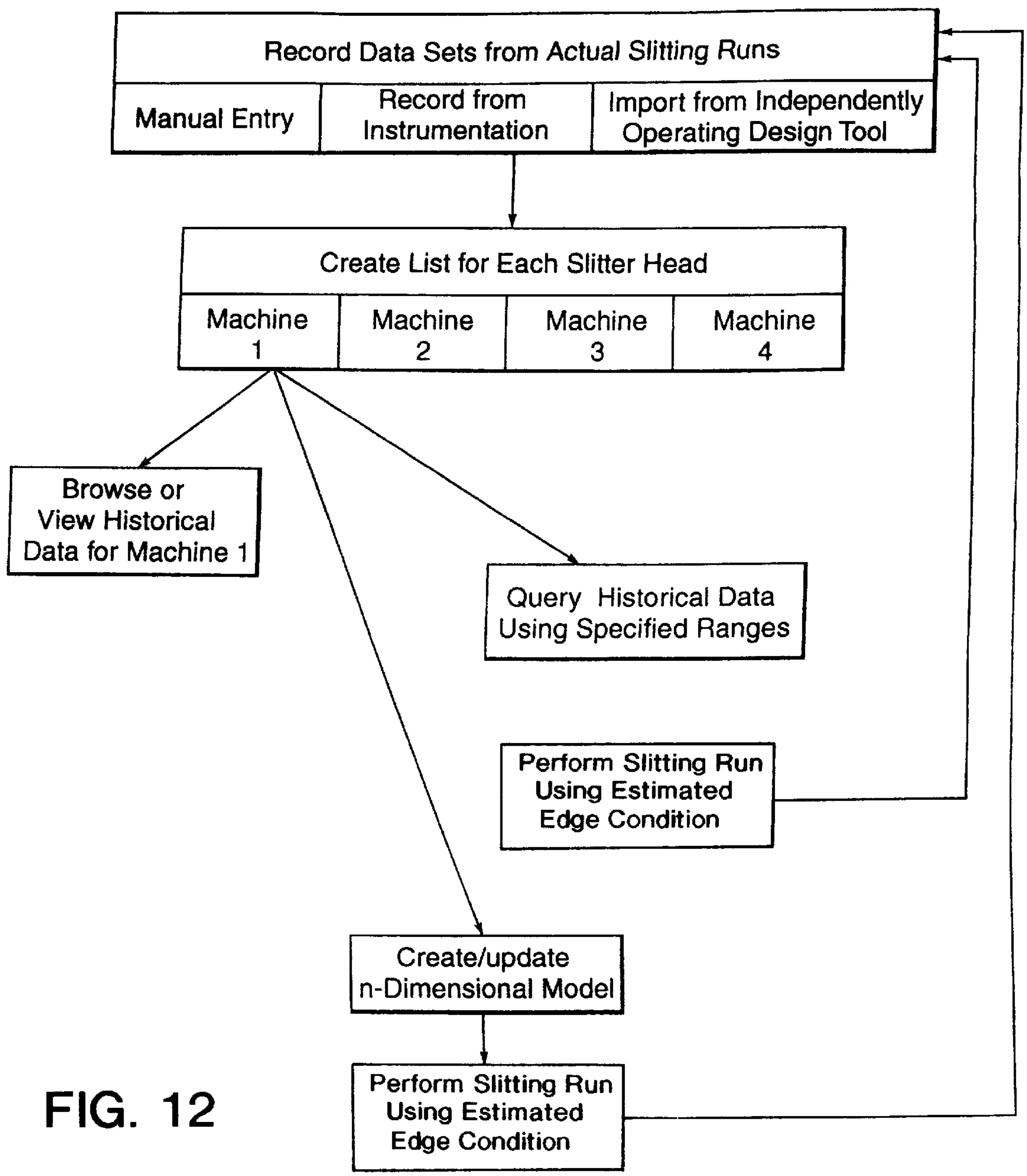
FIG. 12 illustrates a flow chart of the operation and development of an embodiment of the present design tool.

It will be appreciated from the foregoing that, especially in the context of a large number of historical slitting runs, the types of mathematical/statistical fitting methods described heretofore, such as in conjunction with FIGS. 12A and 12B, can conceivably be utilized in connection with numerical designations of qualitative edge conditions. Particularly, just as it is conceivable to mathematically manipulate such numerical designations by averaging them in order to arrive at a predicted edge condition, so is it conceivable to fill in numerical gaps in historical slitting data by applying mathematical fitting methods to arrive at numerical designations of qualitative edge conditions in such gaps. Depending upon the preference of the user, such fitting methods can be tailored to arrive solely at integer values of such numerical designations, in an effort to remain consistent with the manner in which such data is normally expressed, or at values that are not necessarily integer, to reflect a gradual progression from one type of edge condition to another.

Although the practical example discussed heretofore involves qualitatively expressed edge conditions, it is to be understood that similar concepts may be utilized in connection with quantitatively expressed edge conditions. In this case, the concept of mathematically manipulating values relating to quantitatively expressed edge conditions would appear to be much more straightforward, and would not appear to warrant any further discussion here.

If not otherwise stated herein, it may be assumed that all components and/or processes described heretofore may, if appropriate, be considered to be interchangeable with similar components and/or processes disclosed elsewhere in the specification, unless an express indication is made to the contrary.

If not otherwise stated herein, any and all patents, patent publications, articles and other printed publications discussed or mentioned herein are hereby incorporated by reference as if set forth in their entirety herein.

It should be appreciated that the apparatus and method of the present invention may be configured and conducted as appropriate for any context at hand. The embodiments described above are to be considered in all respects only as illustrative and not restrictive. The scope of the invention is defined by the following claims rather than the foregoing description. All changes which come within the meaning and range of equivalency of the claims are to be embraced within their scope.

What is claimed is:

1. A design tool for predictively indicating, in metal slitting, expected edge conditions of alit metal, said design tool being adapted to:

indicate the expected edge conditions qualitatively; and assign a numerical value to each of a predetermined number of qualitatively expressible edge conditions, wherein the assigned numerical values correspond sequentially to the variation of a given physical parameter;

the indication of the expected edge conditions resulting at least partly from:

inputting at least one value corresponding to at least one system variable of the arbor setup;

comparing the at least one input value to the value of at least one corresponding system variable from at least one historical slitting run;

discerning at least one historical slitting run that has a value for the at least one corresponding system variable that is substantially comparable to the at least one input value;

obtaining the at least one numerical value assigned to the edge condition corresponding to the discerned at least one historical slitting run;

mathematically manipulating the at least one numerical value so obtained to produce a numerical result;

determining the edge condition corresponding to the numerical result; and indicating the edge condition so determined.

2. The tool according to claim 1, wherein the mathematical manipulation of the at least one numerical value comprises averaging the at least one numerical value.

3. The tool according to claim 2, wherein the averaged at least one numerical value is rounded in a manner to determine the expected edge condition.

4. The tool according to claim 3, wherein the averaged at least one numerical value is rounded to the nearest whole number.

5. A method of predictively indicating, in metal slitting, expected edge conditions of the metal, said method comprising the steps of:

indicating the expected edge conditions qualitatively;

assigning a numerical value to each of a predetermined number of qualitatively expressible edge conditions, wherein the assigned numerical values correspond sequentially to the variation of horizontal clearance between knives on opposing arbors;

the indication of the expected edge conditions resulting at least partly from:

inputting at least one value corresponding to at least one system variable of the arbor setup;

comparing the at least one input value to the value of at least one corresponding system variable from at least one historical slitting run;

discerning at least one historical slitting run that has a value for the at least one corresponding system variable that is substantially comparable to the at least one input value;

obtaining the at least one numerical value assigned to the edge condition corresponding to the discerned at least one historical slitting run;

mathematically manipulating the at least one numerical value so obtained to produce a numerical result;

determining the edge condition corresponding to the numerical result; and indicating the edge condition so determined.

6. The method according to claim 5, wherein the mathematical manipulation of the at least one numerical value comprises averaging the at least one numerical value.

7. The method according to claim 6, wherein the averaged at least one numerical value is rounded in a manner to determine the expected edge condition.

8. The method according to claim 7, wherein the averaged at least one numerical value is rounded to the nearest whole number.

* * * * *